US006314303B1

(12) United States Patent
Phipps

(10) Patent No.: US 6,314,303 B1
(45) Date of Patent: *Nov. 6, 2001

(54) APPARATUS FOR PROVIDING ENHANCED FUNCTIONALITY TO A MOBILE STATION

(75) Inventor: Alastair Phipps, Bothell, WA (US)

(73) Assignee: AT&T Wireless Services, Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,373

(22) Filed: Jul. 29, 1997

(51) Int. Cl.[7] .................................................. H04M 11/00
(52) U.S. Cl. .......................... 455/555; 455/554; 455/557; 455/573; 455/575
(58) Field of Search ..................................... 455/554, 555, 455/556, 557, 575, 90, 462, 573, 569, 560, 465

(56) References Cited

U.S. PATENT DOCUMENTS

| D. 358,813 | 5/1995 | Hellier et al. . |
| D. 358,821 | 5/1995 | Hellier et al. . |
| 4,658,096 | 4/1987 | West, Jr., et al. . |
| 5,265,150 | * 11/1993 | Helmkamp et al. ................. 455/418 |
| 5,465,401 | 11/1995 | Thompson . |
| 5,479,479 | * 12/1995 | Braitberg et al. ..................... 455/557 |
| 5,524,045 | * 6/1996 | Yazawa ................................. 455/555 |
| 5,548,636 | 8/1996 | Bannister . |
| 5,555,258 | 9/1996 | Snelling et al. . |
| 5,594,952 | * 1/1997 | Virtuoso et al. ..................... 455/557 |
| 5,724,647 | * 3/1998 | Sato .................................... 455/555 |
| 5,732,355 | * 3/1998 | Lipp et al. ............................ 455/555 |
| 5,754,625 | * 5/1998 | Shimura .............................. 455/554 |
| 5,809,432 | * 9/1998 | Yamashita ........................... 455/575 |
| 5,845,207 | * 12/1998 | Amin et al. .......................... 455/414 |
| 5,854,977 | * 12/1998 | Oksasen et al. ..................... 455/417 |
| 5,870,680 | * 2/1999 | Guerlin et al. ....................... 455/557 |
| 5,978,689 | * 11/1999 | Tuoriemi et al. .................... 455/569 |
| 5,991,640 | * 11/1999 | Lilja et al. ........................... 455/557 |
| 6,018,665 | * 1/2000 | Chavez, Jr. et al. ................ 455/462 |
| 6,073,031 | * 6/2000 | Helstab et al. ...................... 455/557 |

* cited by examiner

Primary Examiner—Nguyen T. Vo
Assistant Examiner—Duc Nguyen
(74) Attorney, Agent, or Firm—Kenyon & Kenyon

(57) ABSTRACT

An apparatus interfaces with a mobile station to enhance the functionality of that station. The apparatus can be constituted by a base unit that includes an interface adapted to receive and communicate with the mobile station. The base unit further includes processing capabilities and memory which control call processing functions in conjunction with a wireless switch. The base unit communicates with the wireless switch via a transceiver in the mobile station by the connection to the mobile station at the interface element.

23 Claims, 2 Drawing Sheets

APPARATUS FOR PROVIDING ENHANCED FUNCTIONALITY TO A MOBILE STATION

BACKGROUND OF THE INVENTION

The present invention is directed to an apparatus that provides enhanced functionality for a mobile station. More particularly, the present invention is directed to an apparatus that provides a base unit to which a mobile station can be coupled to increase the functionality of the mobile station in accordance with features available in the base unit.

The communications industry continues to see explosive growth in the area of wireless communications. Such communications have a number of advantages including the fact that wireless communications do not require the same amount of infrastructure for installation as do wired communication networks. Also, wireless communications lend themselves to the use of mobile stations which can be moved throughout a service area.

As wireless systems have become more and more prominent, their uses in different contexts have also been considered. As an example, it has already been disclosed to provide a wireless communication system that corresponds to the functionality of equipment commonly referred to as PBXs or private branch exchanges. Examples of prior art wireless PBX configurations are illustrated in FIG. 1 and 2.

For instance, a station in a wireless PBX environment may be a mobile station such as 10 in FIG. 1. The mobile station could be moved throughout the area (such as a building or campus) serviced by the wireless PBX which could in turn provide certain PBX functionality to the various stations. An alternative configuration is represented in FIG. 2 where a PBX featured desk-set phone, 20, that is not intended to be fully mobile can also communicate via wireless links with a wireless PBX, 21, to provide PBX functionality. An example of such a desk set is disclosed in U.S. Pat. No. 5,465,401 to Thompson.

The above two configurations have limitations, however. In the first system the nature of the handheld device 10 in providing a smaller size to facilitate portability results in a rather limited feature set which can be made available through the handheld device that interacts with the wireless PBX. Also, that feature set tends to be a static feature set defined for the handset. The desk-set configuration has its own limitations in that while it may have sufficient additional memory and processing capability to provide a full complement of PBX functions, it does not have the mobility that the stations or devices of FIG. 1 have because it must include extra processing and memory to be able to provide the full feature set of functions.

It would be advantageous if an apparatus was provided that enabled both a full PBX feature set and yet provided some degree of mobility, thus improving on the configurations of FIG. 1 and FIG. 2.

SUMMARY OF THE INVENTION

The present invention provides an improvement to the known configurations by providing a mobile station that has a first feature set and which is to be in communication with the wireless switch and by providing an additional desk-set enhancement module or base unit that can be coupled to the mobile station and enhance the functionality of the mobile station in its communication via the wireless switch.

In an embodiment of the present invention the base unit includes a cradle that has a mobile station interface that provides electrical connections to a mobile station. The base unit further includes a processor which is coupled to the cradle to permit communications and the flow of control signals from the base unit to the mobile station. A transceiver in the mobile station is used as the communication device when the mobile station is either in the cradle or out of the cradle. A function memory is coupled to the processor in the base unit and provides the capability of enhancing the functionality of the mobile station by providing additional functions in interaction with the wireless switch. These functions could be a more complete set of PBX functions.

The base unit of the present invention could further include a display coupled to the processor and a keypad coupled to the processor to provide the user with visual cues and the ability to provide key-input control information. Also, the base unit may include a microphone and speaker combination that provides hands-free telephony and/or the processor could be coupled to a handset to provide more private communications.

The present invention provides the advantage that the user retains a certain function set capability while having mobility with respect to a wireless switch and can enhance the functionality available through the wireless switch by coupling the mobile station to a base unit that has an interface designed to receive and communicate with the mobile station.

DETAILED DESCRIPTION

The present invention provides an improvement over the prior are by providing a desk-set unit which includes call processing functionality that can interact with a mobile station to provide wireless PBX functions.

Figure 3:
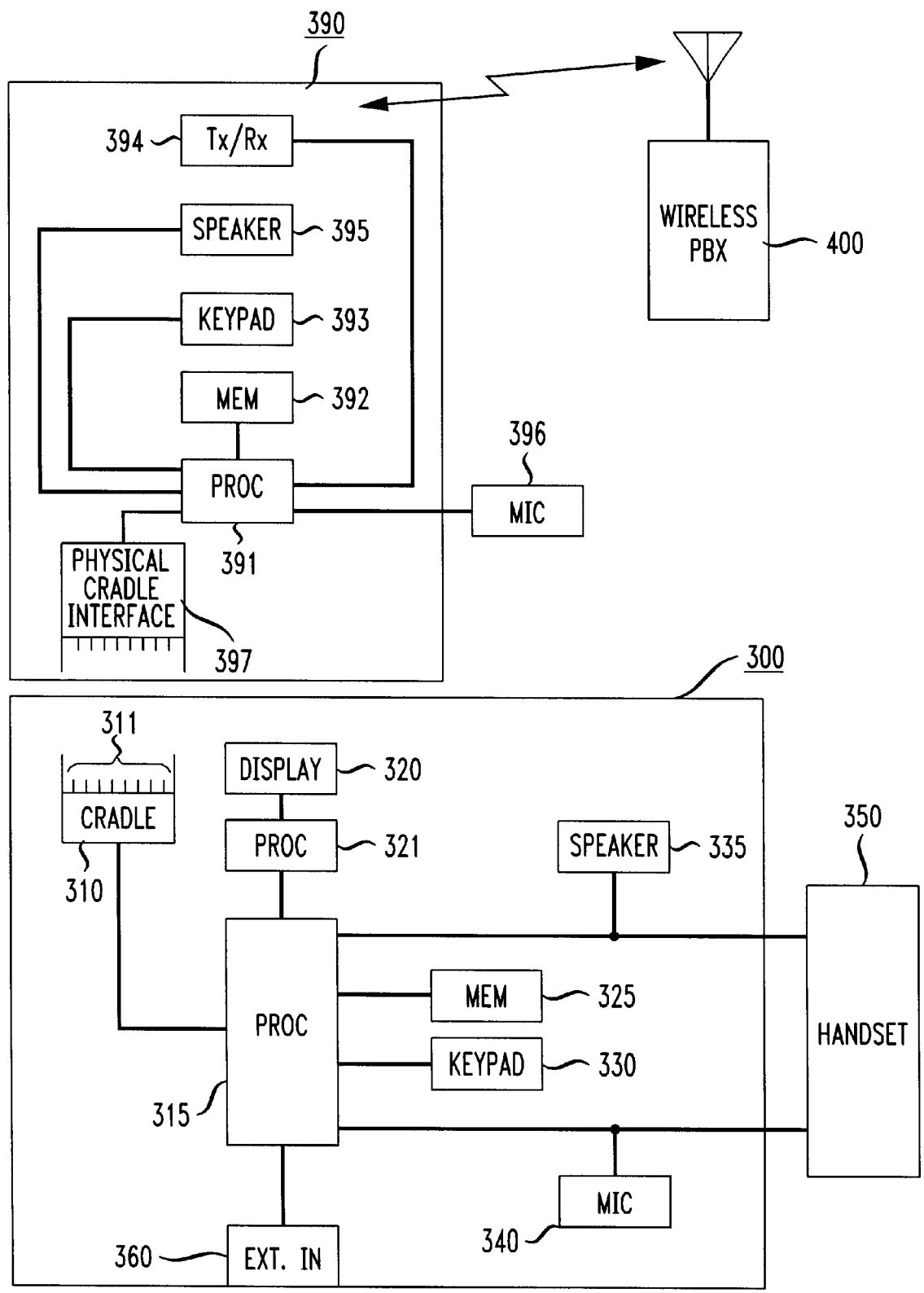
FIG. 3 illustrates a first embodiment of a wireless PBX configuration in accordance with the present invention.

An embodiment of the present invention is illustrated in FIG. 3. In this embodiment a desk-set module or base station 300 is designed to interface with a mobile station 390 via a physical cradle interface 397. The basic physical interface can take the form of a cradle 310 into which the mobile station can be placed. The cradle includes a physical structure that supports the mobile station in a fixed position with respect to the desk set. Furthermore, the cradle includes an electrical interface represented by pins 311 in FIG. 3. The illustrated pins are merely one representation of a type of an electrical interface which might be made between the mobile station and a desk set. Additional configurations might include a socket/plug arrangement whereby an electrical/communication path is established between the internals of the desk-set and the internals of the mobile station.

Figure 1:
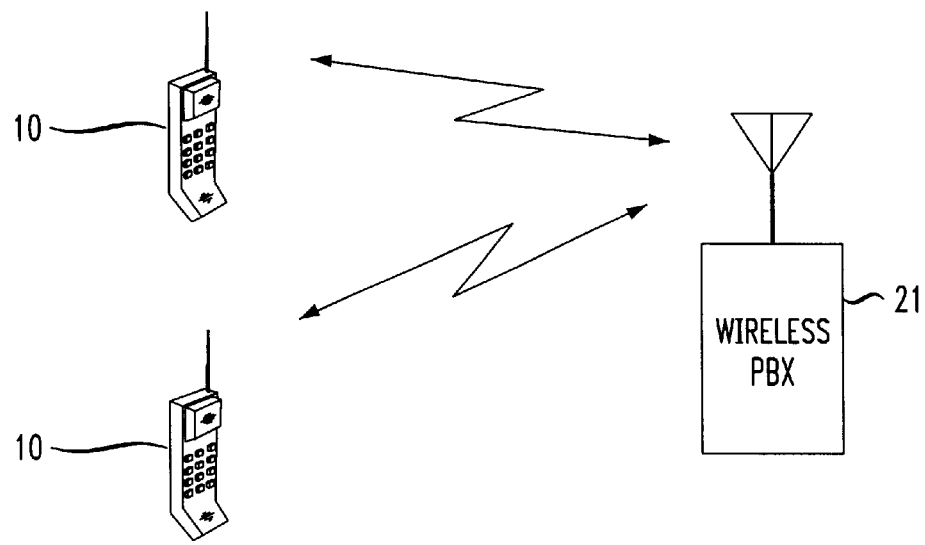
FIG. 1 illustrates a first prior art configuration.
Figure 2:
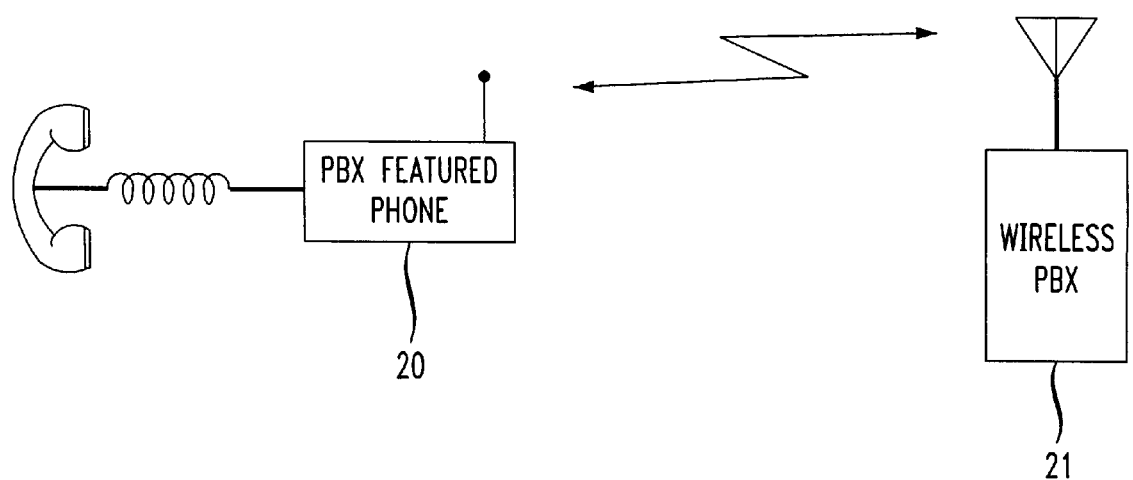
FIG. 2 illustrates an example of a second prior art configuration.

The embodiment of FIG. 3 shows a desk set that also includes a processor 315 and a memory module 325. The memory module contains software that controls the processor operations as well as has the ability to store data and other information dynamically. The module could consist of a single memory element such as a programmable read-only memory (PROM) or a combination of read-only memory and random access memory. The memory module can store software programs sufficient to provide control signals that can interact with the wireless PBX shown in either FIG. 1 or FIG. 2 so as to prompt the switch to provide appropriate PBX functionality. Such functionality includes but is not limited to such call processing capabilities as call forwarding, conference calling, speed dialing, etc. The processor 315 is shown coupled to the cradle 310 that constitutes the electrical interface to the mobile station. In this manner the processor can communicate with the mobile station which itself has processor 391 and memory 392 for controlling a basic set of mobile station functionality. In the present circumstance the mobile station 390 may include a limited set of PBX functionality. The desk set 300 then includes either a supplemental set of PBX related functionality thanks to the software in memory 325 or it could contain a full set of PBX functionality, duplicating the limited functionality which appears in the mobile station. In the former case where the functionality is merely supplemental both processors 315 and 391 would be necessary to implement the full set of PBX functionality while the mobile station is positioned within the cradle of the desk set. If, however, the desk set itself has a full set of PBX functionality, then when the mobile station is positioned in a desk set the processor 315 and memory 325 can essentially control the PBX function calling operation. In that circumstance, the mobile station is needed only for its wireless transmission capabilities which occur through transceiver 394. It is the transceiver in the mobile station which provides the wireless connection between the mobile station and the wireless PBX 400 or the mobile station/desk set (300 and 390) configuration and the wireless PBX 400. Therefore, the functionality which is achieved in the arrangement of the mobile station in the desk-set is such that functionality implementable only by means of the processor 315 and memory 325 still relies upon the transceiver in the mobile station. Thus, the two elements, the mobile station 390 and the desk set 300 work in concert to provide the full set of functionality which is accessible through the wireless switch with which the mobile station/desk-set combination communicates.

In the present embodiment the desk-set is further shown to include a number of additional elements which can improve the desk-set's ability to interface with the user. For instance, the desk-set is shown with a display 320. The display is shown connected to a processor 321 which itself is coupled to processor 315. The display could be constituted by any such visual display as a liquid crystal display or an electro-luminescent display. The display would provide visual feedback to the user either in the terms of the indication of a calling number identification, that is the number of the party attempting to contact the user, or show the numbers or functions requested by the user via keypad 330.

Additionally, the desk-set may provide different audio communication interfaces to supplement the speaker 395 and microphone 396 of the mobile station. In fact, when the mobile station is placed in cradle 310 the processor 391 could be prompted to prohibit operation of the speaker 395 and microphone 396. The audio communication interface responsibilities would then be assumed by either the handset 350 which could take the form of a typical desk-set handset that includes a microphone or speaker, or a separate microphone 340 and speaker 335 could be built into the desk set to provide hands-free telephony. All of these audio interface elements are shown coupled to processor 315.

An additional potential communication interface is shown as an external interface 360. This external interface could provide processor to processor interfaces between a processor and a desk set, 315, and a personal computer processor or other computing device processor which is not shown in the drawing figure. This ability to connect what could constitute an adjunct processor would permit the user to further supplement the processing capabilities of the desk set. In one example an external computer configuration could be used to download information into memory 325 to initialize, modify or replace the software that provides PBX control related features.

In accordance with the disclosed embodiment the desk set provides the capability of enhancing the functionality of the mobile station. The mobile station retains the advantage of being able to be moved throughout the area served by the wireless PBX 400. It can do so with a limited function set. However, the mobile station can operate in concert with the desk-set which would typically be located in a single location (and would be mobile only to the extent that someone wished to move it to another desk but not truly mobile in the same manner as the mobile station so as to provide a more complete set of functionality in conjunction with the wireless switch.

As a consequence of this arrangement, the user gets the benefit of full set functionality for operation with the wireless switch while retaining some additional mobility.

It should be noted that the power supply of the desk set 300 is not shown. The desk-set could be operated by means of a battery. In a more likely scenario the desk-set would be powered by an AC line connection to some AC power outlet. The power supply for the desk-set could also be coupled to the cradle 310 so as to power the mobile station while the mobile station is in contact with the cradle. Furthermore, the power supply could be designed in both the desk set and the mobile station to permit the cradle to re-charge a battery in the mobile station at the same time that the mobile station is coupled to the cradle.

What is claimed is:

1. In a wireless mobile switching system, an improvement comprising:
   a mobile station, comprising:
      a first memory having stored therein program instructions that define a first feature set for private branch exchange call processing for the mobile station, and
      a physical cradle interface that enables a transfer of signals between said memory and a mobile station cradle; and
   a mobile station cradle including
      a second memory having stored therein program instructions that define a second feature set for enhanced private branch exchange call processing for the mobile station, and
      a mobile station physical interface that enables a transfer of signals between said second memory and said mobile station via said mobile station physical cradle interface.

2. The improvement of claim 1 wherein said enhanced private branch exchange call processing includes at least one private branch exchange function.

3. The improvement of claim 2 wherein said at least one private branch exchange function includes a call transfer function.

4. The wireless mobile switching system of claim 1 further comprising a private branch exchange switch capable of communicating with said mobile station.

5. The improvement of claim 4 wherein said enhanced private branch exchange call processing includes at least one private branch exchange function.

6. The improvement of claim 5 wherein said at least one private branch exchange function includes a call transfer function.

7. An apparatus for enhancing functionality of a mobile station, the mobile station characterized by a first feature set for private branch exchange call processing, comprising:

a mobile station physical interface that establishes an electrical connection with a mobile station; and a function enhancement module coupled to said mobile station physical interface and capable of communicating with said mobile station, wherein said function enhancement module includes a memory storing program instructions that define a second feature set for enhanced private branch exchange call processing for a stand alone mobile station.

8. The apparatus of claim 7 further including a power supply circuit that is coupled to said mobile station physical interface and provides power to a mobile station coupled to said mobile station physical interface.

9. The apparatus of claim 7 wherein said apparatus further comprises a processor coupled to said memory and operating under the control of program instructions in said memory.

10. The apparatus of claim 9 wherein said processor communicates with a wireless switching exchange via said mobile station interface.

11. The apparatus of claim 10 further comprising a handset that is coupled to said processor and that provides an audio interface to a user.

12. The apparatus of claim 10 further comprising a keypad, coupled to said processor.

13. The apparatus of claim 12 further comprising a display coupled to said processor.

14. An apparatus for supplementing a first feature set for private branch exchange call processing of a mobile station, comprising:

a mobile station interface;

a processor coupled to said mobile station interface;

a memory, coupled to said processor and that stores program instructions that define a second feature set for enhanced private branch exchange call processing of the mobile station;

display coupled to said processor;

a keypad coupled to said processor;

a microphone coupled to said processor; and a speaker coupled to said processor.

15. The apparatus of claim 14 further comprising an interface to an external processing device.

16. The apparatus of claim 14 wherein said external processing device comprises a personal computer.

17. An apparatus for wirelessly communicating with a private branch exchange switch, comprising:

a mobile station having a first feature set for private branch exchange call processing associated therewith; and a cradle in communication with the mobile station, said cradle comprising:

a processor;

a memory storing program instructions that define a second feature set for enhanced private branch exchange call processing;

a display coupled to said processor;

a keypad coupled to said processor;

a microphone coupled to said processor; and a speaker coupled to said processor;

wherein said mobile station provides a continuous communication channel to the private branch exchange switch.

18. A method of wireless communication, comprising:

electrically coupling a mobile station that has a first set of private branch exchange call features stored in a memory therein with a cradle that has a second set of enhanced private branch exchange call features stored in a memory therein, initiating a wireless call according to the first and second sets of call features, and thereafter, de-coupling the mobile station from the cradle and conducting a remainder of the wireless call according to the first set of call features.

19. A wireless communication system, comprising:

a portable communication unit, including:

a wireless communication interface, a memory having stored therein program instructions that define a first feature set for private branch exchange call processing for the portable communication unit; and a cradle unit interface; and a cradle unit, including:

a memory having stored therein program instructions that define a second feature set for enhanced private branch exchange call processing for said portable communication unit, and a portable communication unit interface that enables a transfer of signals between said memory of the cradle unit and said memory of the portable communications unit via said cradle unit interface.

20. The wireless communication system of claim 19, wherein said cradle unit excludes a wireless communication interface.

21. The wireless communication system of claim 19, wherein said cradle unit interface enables the transfer of signals from said portable communication interface to a public branch exchange via said wireless communication interface.

22. The wireless communication system of claim 11 further comprising a public branch exchange coupled to the wireless communication interface of said portable communication unit, said cradle unit being coupled to said private branch exchange via the wireless communication interface, the cradle unit interface and the portable communication interface.

23. A wireless communication system, comprising:

a portable communication unit, including:

a cradle unit interface, a wireless communication interface, and memory having stored therein program instructions defining a first feature set for private branch exchange call processing, comprising call origination and call termination; and a cradle unit, including:

a memory having stored therein program instructions defining a second feature set for enhanced private branch exchange call processing, comprising call forwarding, conference calling, and speed dialing, and a portable communication unit interface that enables a transfer of signals between said memory of the cradle unit and said memory of the portable communications unit via said cradle unit interface.

* * * * *